(12) United States Patent

Kuepper et al.

(10) Patent No.: US 12,589,336 B1

(45) Date of Patent: Mar. 31, 2026

(54) LIGHTWEIGHT FIBROUS MEDIA (LFM) FILTER

(71) Applicants: Theodore A. Kuepper, Oxnard, CA (US); Robert C. Lovo, Somis, CA (US)

(72) Inventors: Theodore A. Kuepper, Oxnard, CA (US); Robert C. Lovo, Somis, CA (US)

( * ) Notice: Subject to any disclaimer, the term of this patent is extended or adjusted under 35 U.S.C. 154(b) by 89 days.

(21) Appl. No.: 18/198,008

(22) Filed: May 16, 2023

Related U.S. Application Data

(63) Continuation-in-part of application No. 17/577,558, filed on Jan. 18, 2022, now abandoned.

(51) Int. Cl.
| | |
|---|---|
| *B01D 24/12* | (2006.01) |
| *B01D 24/46* | (2006.01) |
| *B01D 27/02* | (2006.01) |
| *B01D 39/02* | (2006.01) |

(52) U.S. Cl.
CPC ......... *B01D 24/12* (2013.01); *B01D 24/4631* (2013.01); *B01D 24/4689* (2013.01); *B01D 27/02* (2013.01); *B01D 39/02* (2013.01); *B01D 2201/086* (2013.01); *B01D 2201/202* (2013.01)

(58) Field of Classification Search
None
See application file for complete search history.

(56) References Cited

U.S. PATENT DOCUMENTS

| | | | | |
|---|---|---|---|---|
| X6739 | I1 * | 8/1831 | Barron | 210/351 |
| 121,065 | A * | 11/1871 | Schmidt | B30B 9/067 |
| | | | | 100/116 |
| 252,718 | A * | 1/1882 | Bell | B01D 24/165 |
| | | | | 210/351 |
| 515,769 | A * | 3/1894 | Harris | B01D 29/46 |
| | | | | 210/411 |
| 620,621 | A * | 3/1899 | Veazie | A47J 43/24 |
| | | | | 210/291 |
| 622,614 | A * | 4/1899 | Fleetwood | B01D 29/01 |
| | | | | 210/267 |
| 666,222 | A * | 1/1901 | Jones | B01D 24/165 |
| | | | | 210/333.1 |
| 857,450 | A * | 6/1907 | De Land | B01D 24/4884 |
| | | | | 210/287 |
| 1,367,325 | A * | 2/1921 | Probst | B01D 24/165 |
| | | | | 210/453 |

(Continued)

*Primary Examiner* — Robert J Popovics

(74) *Attorney, Agent, or Firm* — FITCH EVEN TABIN & FLANNERY LLP

(57) ABSTRACT

A filtration system using lightweight fibrous media (LFM) filter balls that are pre-compressed into an intermediary vessel or element before placing into an outer pressure-holding housing and where the LFM filter balls can be removed periodically to allow separation and relaxation of the media for cleaning. A plurality of lightweight fibrous media balls is pre-compressed at a predetermined ratio of compression and packing density inside their intermediary vessel or element before installation into an outer housing capable of holding pressures of a water flow, thereby forming a single filter mass providing multitudes of tortuous paths through which water can flow and the filter media can capture small particulate matter to reduce turbidity and other water-borne particulate contaminants.

1 Claim, 13 Drawing Sheets

(56) References Cited

U.S. PATENT DOCUMENTS

| | | | | |
|---|---|---|---|---|
| 1,930,209 A * | 10/1933 | Milkey | B01D 24/04 | 210/488 |
| 2,364,240 A * | 12/1944 | Parry | B01D 27/08 | 210/457 |
| 2,559,133 A * | 7/1951 | Schultz | B01D 27/02 | 210/470 |
| 3,617,551 A * | 11/1971 | Johnston | C10G 33/06 | 210/671 |
| 4,186,101 A * | 1/1980 | Reinhardt | B01D 39/14 | 55/528 |
| 4,350,590 A * | 9/1982 | Robinson | B03C 5/024 | 210/243 |
| 4,468,324 A * | 8/1984 | de Lappe | B01D 46/12 | 210/485 |
| 4,776,962 A * | 10/1988 | Wakeman | B01D 24/4668 | 210/243 |
| 5,015,375 A * | 5/1991 | Fleck | B01D 24/08 | 210/450 |
| 5,248,415 A * | 9/1993 | Masuda | B01D 39/1623 | 210/275 |
| 5,587,239 A * | 12/1996 | Ueba | C02F 3/085 | 428/377 |
| 5,985,148 A * | 11/1999 | Liu | C02F 3/103 | 210/150 |
| 6,605,216 B1 * | 8/2003 | Lederman | B01D 29/036 | 210/269 |
| 7,093,720 B2 * | 8/2006 | Hoffmeier | B01D 24/08 | 210/350 |
| 7,204,930 B2 * | 4/2007 | Nightingale | C02F 1/74 | 210/111 |
| 7,223,347 B2 * | 5/2007 | Boner | B01D 24/12 | 210/795 |
| 7,374,676 B2 * | 5/2008 | Dew, Jr. | B01D 24/002 | 210/291 |
| 7,435,351 B2 * | 10/2008 | Boner | C02F 1/004 | 210/795 |
| 7,572,383 B2 * | 8/2009 | Dew, Jr. | B01D 24/4663 | 210/741 |
| 9,169,580 B2 * | 10/2015 | Griggs | C02F 1/001 | |
| 9,440,864 B2 * | 9/2016 | Woo | C02F 1/001 | |
| 10,722,829 B2 * | 7/2020 | Morris | D04H 1/5418 | |
| 10,864,465 B2 * | 12/2020 | Boyd | B01D 24/4626 | |
| 10,913,667 B2 * | 2/2021 | St. Germain | C02F 1/285 | |
| 10,920,364 B2 * | 2/2021 | Choi | D06F 43/007 | |
| 11,052,338 B2 * | 7/2021 | Morris | B01D 39/1623 | |
| 11,247,918 B2 * | 2/2022 | St. Germain | B01D 15/00 | |
| 11,446,590 B2 * | 9/2022 | Boyd | B01D 24/4621 | |
| 11,554,333 B2 * | 1/2023 | Farley | B01D 39/04 | |
| 11,583,788 B1 * | 2/2023 | Kuepper | C02F 1/004 | |
| 11,717,775 B2 * | 8/2023 | Maiworm | B01D 29/52 | 210/323.1 |
| 2003/0111431 A1 * | 6/2003 | Dew, Jr. | B01D 24/002 | 210/807 |
| 2004/0140256 A1 * | 7/2004 | Dew, Jr. | B01D 24/4663 | 210/274 |
| 2004/0226897 A1 * | 11/2004 | Boner | B01D 24/12 | 210/793 |
| 2005/0011825 A1 * | 1/2005 | Hoffmeier | B01D 24/4631 | 210/426 |
| 2005/0161411 A1 * | 7/2005 | Boner | B01D 24/4631 | 210/793 |
| 2005/0161412 A1 * | 7/2005 | Boner | C02F 1/004 | 210/275 |
| 2008/0245743 A1 * | 10/2008 | Dew | B01D 24/4663 | 210/745 |
| 2008/0257804 A1 * | 10/2008 | Dew | B01D 24/4663 | 210/170.08 |
| 2008/0257805 A1 * | 10/2008 | Dew | B01D 24/04 | 210/259 |
| 2011/0147321 A1 * | 6/2011 | Oz | B01D 24/08 | 210/287 |
| 2013/0125346 A1 * | 5/2013 | Griggs | B65B 51/04 | 19/145 |
| 2016/0271540 A1 * | 9/2016 | Nielsen | B01D 24/10 | |
| 2018/0221799 A1 * | 8/2018 | Morris | D04H 1/5418 | |
| 2021/0402331 A1 * | 12/2021 | Farley | B01D 35/26 | |

* cited by examiner

PRIOR ART

LIGHTWEIGHT FIBROUS MEDIA (LFM) FILTER

REFERENCE TO PRIOR APPLICATION

This application is a continuation-in-part of application Ser. No. 17/577,588 filed Jan. 18, 2022 entitled LIGHTWEIGHT FIBROUS MEDIA (LFM) FILTER by Theodore Kuepper.

BACKGROUND OF THE INVENTION

Field of the Invention

The field of this invention relates generally to the field of filtration using filter media and more particularly toward a filter that uses pre-compressed lightweight fibrous media (identified as LFM thereafter) in the shape of filter balls for effective removal of water-borne particulate matter as small as 10-microns in size. Because of its compact size and lightweight materials used, a filter using LFM filter balls results in a configuration that is especially suitable for mobile applications, and uses filter media that are washable and reusable, thus reducing logistical support especially important for military and disaster relief operations.

DESCRIPTION OF THE PRIOR ART

The use of filter balls that are lightweight and fibrous are known in the prior art with two distinct characteristics. One characteristic of the prior art methods includes the placement of individual filter balls in a housing without pre-compression of the balls. During testing, this approach has proven to not work well because inadequate pre-compression of the filter balls does not create a dense-enough filtration media mass to remove small, water-borne particulates. And it is small, water-borne particulates that create turbidity in water, a very important measure of water quality. It is turbidity that must be removed by filtration in order to render water suitable for direct potable use or to prepare water for more sophisticated treatment by use of membranes and other methods.

Another characteristic of the prior art methods includes the use of a mechanical apparatus to try to pre-compress filter balls, but a uniform filter media mass is very difficult to achieve with such a configuration and is certainly not appropriate for medium-flow and low-flow filtration systems because it would require mechanical components with sophisticated sealing surfaces that are complicated, cumbersome and expensive to fabricate, install and maintain. Inadequate pre-compression and the complication, size and expense of mechanical devices to try to pre-compress filter balls are precisely why filter balls are not typically used today for filtration applications, especially those associated with potable water treatment.

It is the object of the instant invention to provide an improved apparatus and method that overcomes the shortcomings of the prior art. This is accomplished by placing the LFM filter balls into an intermediary vessel, for example in the form of a cartridge or basket, and then placing the intermediary vessel into a housing that can withstand the pressure of water flow. Pre-installing the LFM filter balls into an intermediary vessel allows the formation of a consistent, pre-determined density of fibers to create a filter with known particulate-removal characteristics. This is a quality that is very important and required for most water treatment applications.

When humanity first discovered how to filter water to remove impurities, it was a giant leap for the health of human civilization. Unfortunately, particulate filtration in the third decade of the twenty-first century, is still reliant on heavy granular media, cartridges, and bag filter solutions, with designs that, in some cases, date back thousands of years. The Lightweight Fibrous Media, or LFM Filter, has the potential to be one of the first significant innovations in particulate filtration and comprises an impressive array of attributes that include cleanable, high particulate holding capacity, 10-micron water quality effectiveness, lightweight, compact, economical, and simplicity of use.

Most notably, the LFM media functions as a media filter, but in the form and size of a cartridge filter. Because of this, the LFM filter can hold orders of magnitude more particulates compared to conventional cartridges and bag filters while providing a consistent 10-micron removal of particulates. Additionally, the LFM Filter is cleanable and can be reused multiple times eliminating the need for a continuous supply of replacement media. The LFM Filter is an environmentally-friendly product for a green future and a perfect addition to any filter manufacturer searching for a better way to support the upcoming green revolution.

SUMMARY OF THE INVENTION

The basic embodiment of the present invention teaches a filtration system comprising: a plurality of lightweight fibrous media (LFM) filter balls; pre-compression of said LFM balls into a pre-determined single mass for a known, uniform and consistent level of filtration therethrough of raw water; a housing for the placement of said LFM filter ball mass wherein when said raw water is introduced into said housing through a water inlet and said raw water passes through said LFM mass through a multitude of tortuous paths for the trapping of small particulates or other contaminants in said raw water therein and said filtered water exits said housing through an outlet and wherein said LFM mass can be relaxed into a non-compressed state for cleaning and re-use.

The above embodiment can be further modified by defining that pre-compression is accomplished through the introduction of a pre-compression plate into said housing to apply a consistent force and pressure to said LFM mass.

The above embodiment can be further modified by defining that said pre-compression plate can include one or more standoff members to create force onto said LFM mass.

The above embodiment can be further modified by defining that said pre-compression plate has one or more apertures therethrough.

The above embodiment can be further modified by defining that pre-compression is accomplished through the manual introduction of said lightweight fibrous media into said housing and compacted therein.

The above embodiment can be further modified by defining that pre-compression is accomplished through the force of water acting against a pre-compression plate.

The above embodiment can be further modified by defining that said LFM mass is forced to relax and separate to facilitate cleaning when a specific differential pressure is reached inside of said housing and across said LFM mass.

The above embodiment can be further modified by defining that said LFM mass is forced to relax and separate to facilitate cleaning at pre-determined time intervals.

The above embodiment can be further modified by defining that said LFM filter balls are removed periodically for separation, relaxation and manual cleaning by hand, or alternatively, in a separate washing machine.

The above embodiment can be further modified by defining that said mass is forced to separate and relax inside said housing to facilitate cleaning through the introduction of turbulent water and airflow into said housing through said inlet thereby forcing said pre-compression plate upward from said inlet thereby separating and relaxing said mass into individual lightweight fibrous media balls which are agitated and cleaned through the force of said turbulent water and airflow.

The above embodiment can be further modified by defining that said lightweight fibrous media balls are placed directly and pre-compressed into said housing.

The above embodiment can be further modified by defining that said LFM filter balls are placed and pre-compressed into an intermediary vessel, such as a filter cartridge and then said filter cartridge is placed inside of said housing.

The above embodiment can be further modified by defining that said LFM filter balls are placed and pre-compressed into an intermediary vessel, such as a basket typically used to hold a bag filter and then said basket is placed inside of said housing.

The above embodiment can be further modified by defining that a perforated tube is placed into said intermediary vessel and into said LFM filter ball mass for the movement of filtered water therethrough.

The above embodiment can be further modified by defining that said filter housing is connected via conduit on one end to a standby container containing clean lightweight fibrous media balls and via a second conduit on a second end to a washer device wherein said conduits allow for the movement therethrough of lightweight fibrous media such that lightweight fibrous media in said standby container moves through said conduit into said filter housing after the lightweight fibrous media inside of said filter housing has been removed through said second conduit for cleaning inside of said washer device so that filtration may continue while previously used and dirty lightweight fibrous media are being cleaned after which said cleaned lightweight fibrous media is returned to said standby container.

The above embodiment can be further modified by defining that one or more agitators are housed inside of said washer device to clean said lightweight fibrous media.

The identification of a cartridge or basket is used to illustrate an intermediary vessel that holds the LFM filter balls in a pre-determined and dense filter mass, but it is understood that other vessel configurations are also possible to hold the LFM filter balls together before installation into an outer housing.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 7A does not show the complete auto-clean system configuration and most notably does not show the separate LFM washer device.

FIG. 7B shows the Lightweight Filter Media being transported into a separate washer device in an auto-clean system configuration after the LFM became dirty during use inside the filter housing. Note: FIG. 7B does not show the complete auto-clean system configuration and most notably does not show the LFM stand-by container.

FIG. 7C shows clean Lightweight Filter Media being transferred to the filter housing after dirty LFM have been removed to a separate washer device. Note: FIG. 7C does not show the complete auto-clean system configuration and most notably does not show the separate LFM washer device.

FIG. 7D shows the newly cleaned Lightweight Filter Media being transferred to a stand-by container after cleaning in a separate washer device. Note: FIG. 7D does not show the complete auto-clean system configuration and most notably does not show the LFM filter housing.

Figure 1:
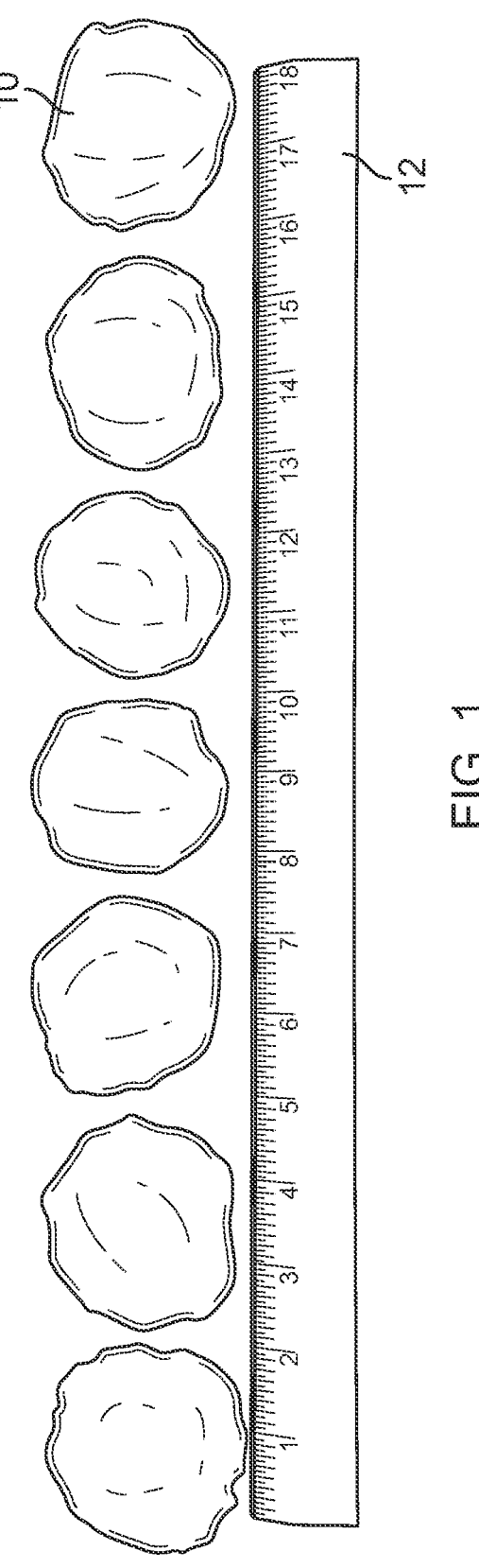
FIG. 1 is a plan view of a plurality of the lightweight fibrous media (LFM) filter balls as used in the instant invention set against a ruler to provide context for a typical size of said media. It is understood that other shapes used to make lightweight fibrous media filters that are not shaped like balls are also envisioned to work as this invention describes. For example, a square or oblong shape could be used to make lightweight fibrous media filters. But for ease of clarification for this invention, a ball shape is used to describe the invention.

DETAILED DESCRIPTION OF A PREFERRED
EMBODIMENT

Turning to the drawings, the preferred embodiment is illustrated and described by reference characters that denote similar elements throughout the several views of the instant invention.

The preferred embodiment of the instant invention provides for a filtration system that utilizes pre-compressed Lightweight Filter Media (hereinafter "LFM") filter balls 10. The LFM filter uses a synthetic material shaped into fibrous balls 10. As shown in FIG. 1, a line of 7 LFMs 10 are shown next to a ruler 12 for scale. The individual LFM filter balls 10 are pre-compressed during installation into an intermediary vessel that permits a consistently dense filter mass to create thousands of tortuous paths through which water must flow during filtration. During filtration, the tortuous paths entrain and remove particulates, such as suspended solids, as the solids become trapped in the multiple layers and folds of the LFM filter balls 10. After the LFM filter becomes dirty from use as a filter due to its entrainment of particulates, the LFM filter balls, being a multitude of individual, separate objects are removed from their housing and intermediary vessels, separated and allowed to relax and expand in order to be cleaned either by manual means or by a separate washer device.

When a differential pressure of 10 to 15 psi is reached or, alternatively, according to a pre-determined timed schedule, the LFM filter balls 10 are removed from their housing and intermediary vessels for manual cleaning or alternatively, by cleaning in a washing device. Either method can impart turbulence on the LFM filter balls to remove entrained particulates from the filter balls' fibrous media in order to clean for reuse;

The LFM filter of the instant invention uses a multitude of individual LFM filter balls 10 that are pre-compressed before and during filtration to make one larger, higher flow, filter media mass 16. The amount of compression dictates the level of filtration. This is why the use of an intermediary vessel is so important to ensure a consistent filter media mass is created within the housing. The LFMs 10 are relaxed during manual cleaning or alternatively, in a washing machine, in order for entrained particulates to be accessible for removal. Seven individual LFM filter balls 10 are shown in FIG. 1 next to a ruler 12, as noted above, for scale. According to the instant invention, the method of use involves the pre-compression of the LFM filter balls 10 to create a single, densely-packed filter media mass with thousands of tortuous paths to produce excellent filtration in a very lightweight package without using complicated, cumbersome, and relatively expensive mechanical devices.

During filtration, those tortuous paths entrain and remove particulates, such as suspended solids, as the solids become trapped in the multiple layers and folds of the LFMs 10.

Figure 2A:
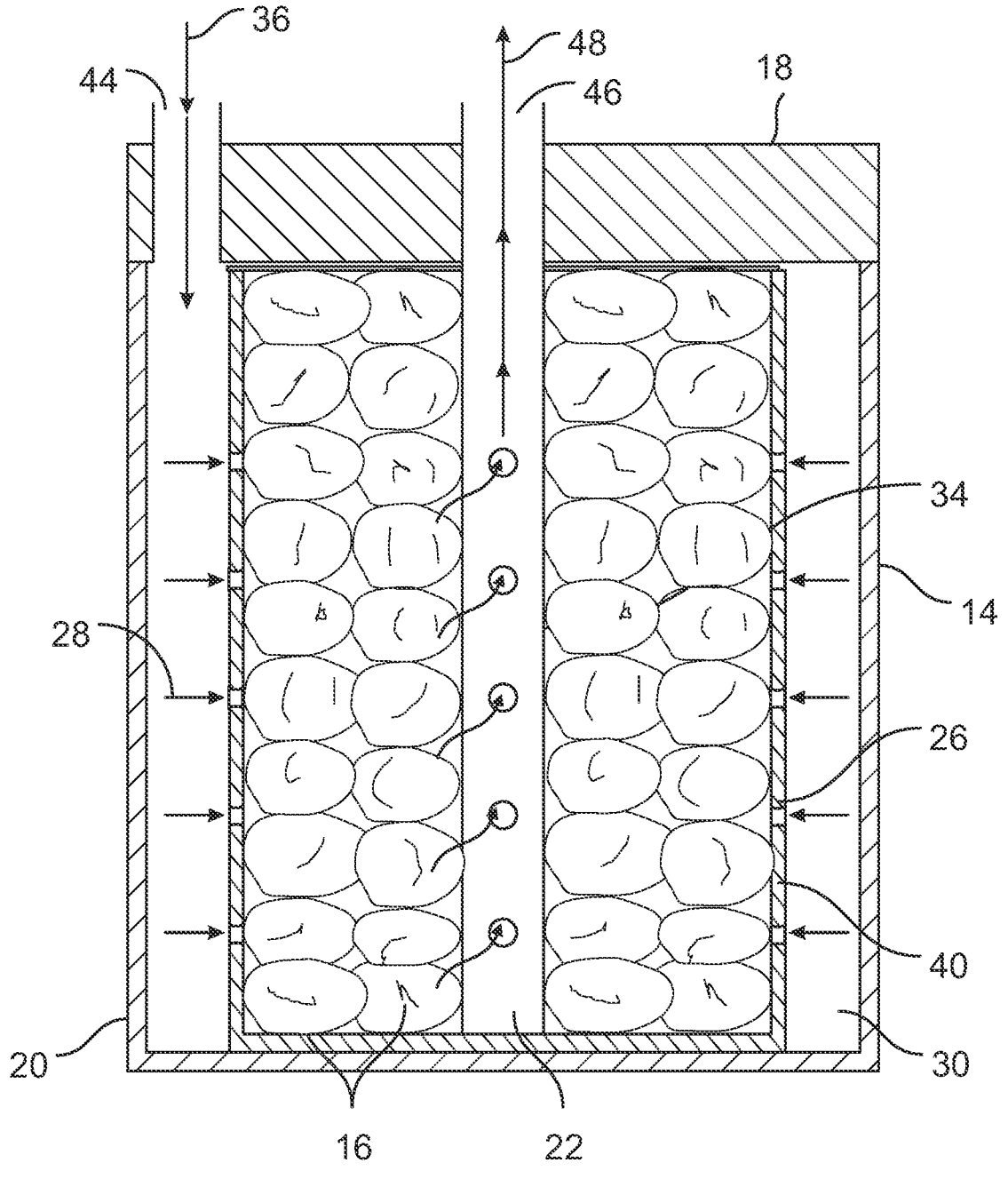
FIG. 2A is a cross-sectional view of an alternate embodiment of the lightweight fibrous media filter of the instant invention wherein the LFM filter balls are pre-compressed by pre-installing into either an intermediary vessel, such as a filter cartridge or a perforated basket, that is then installed into an outer housing during filtration and use.
Figure 2B:
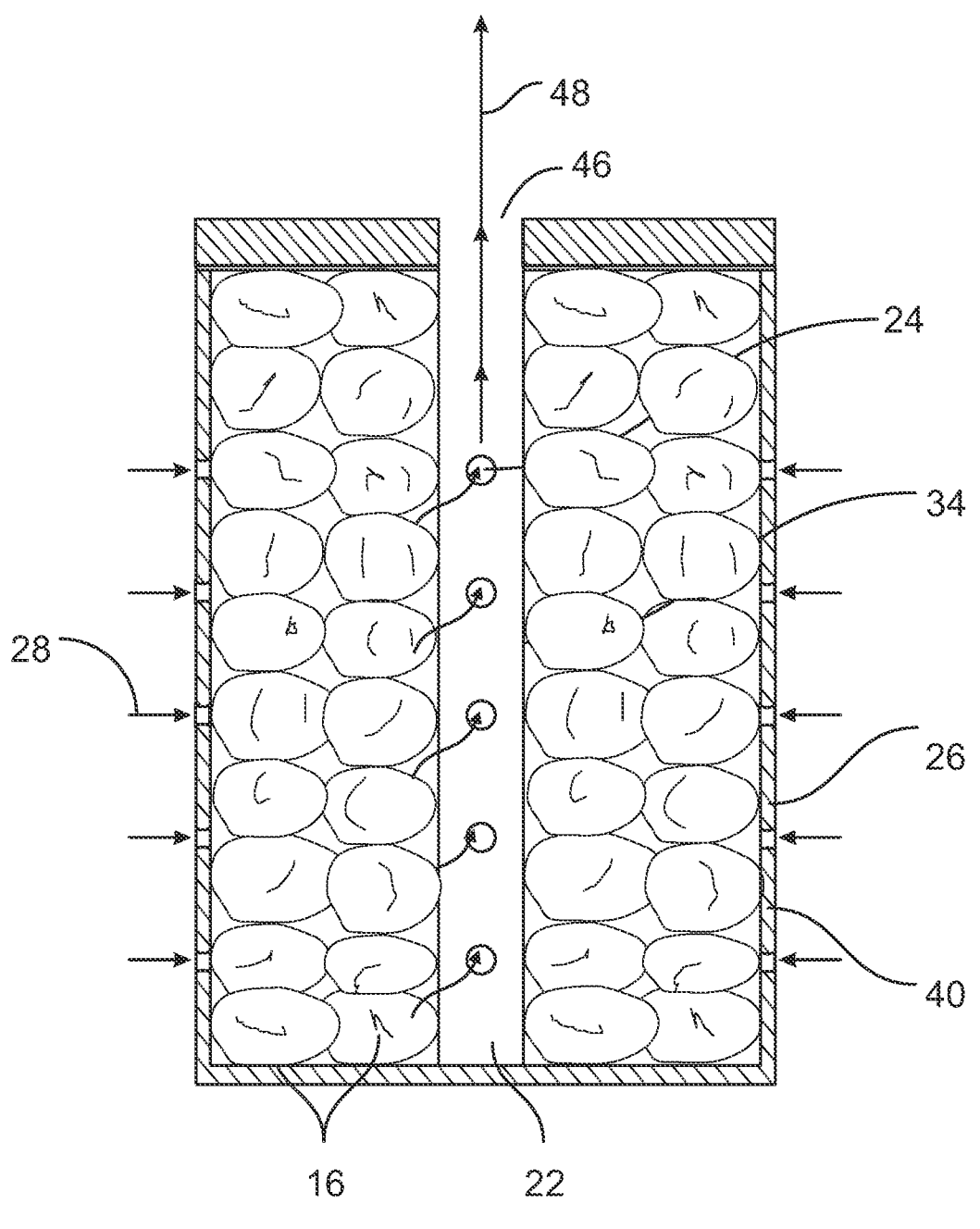
FIG. 2B is a cross-sectional view of the embodiment shown in FIG. 2A but wherein the filter cartridge is not placed inside of an outer housing to clarify its configuration.
Figure 2C:
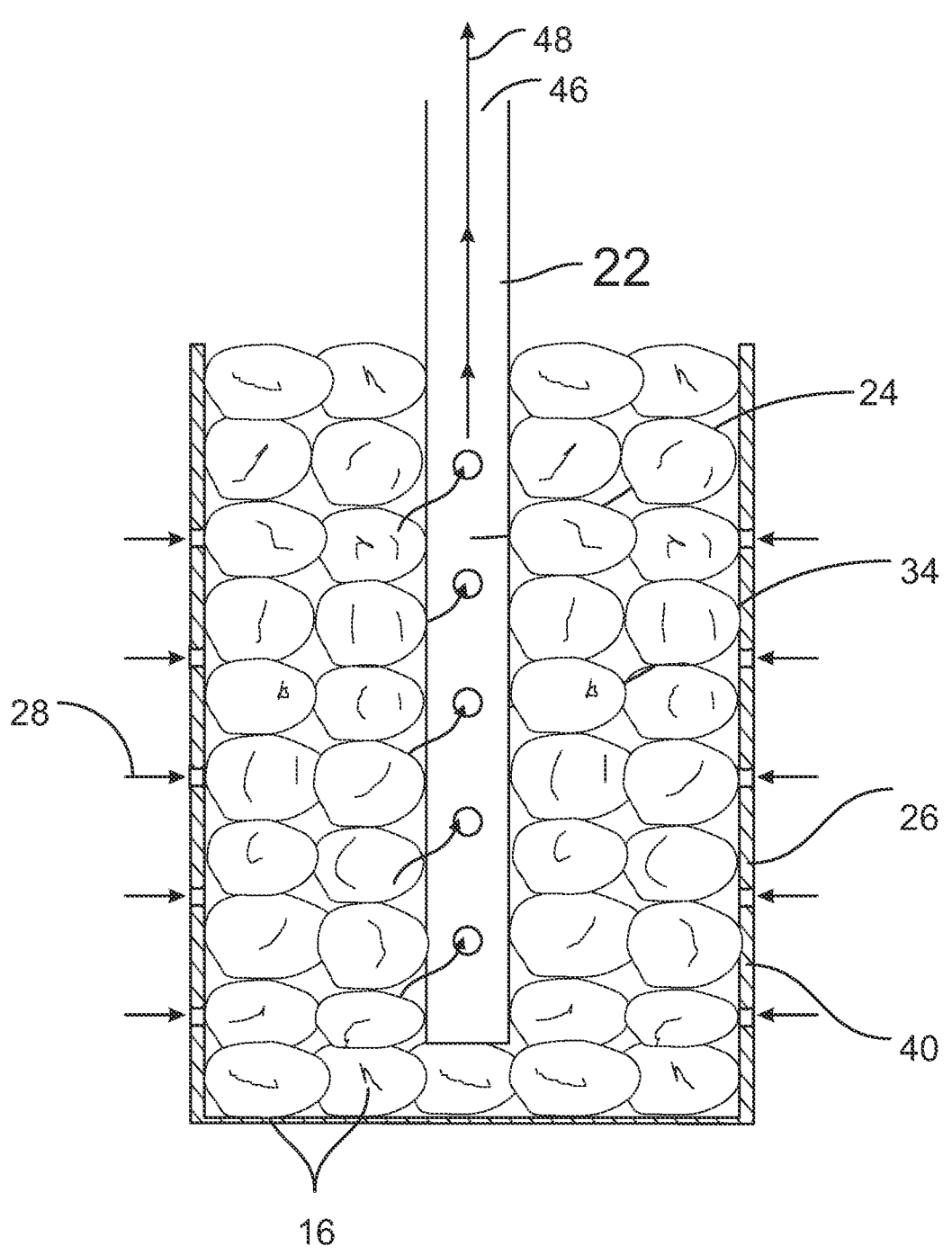
FIG. 2C is a cross-sectional view of the embodiment shown in FIG. 2A but wherein the perforated basket is not placed inside of an outer housing to clarify its configuration.
Figure 3A:
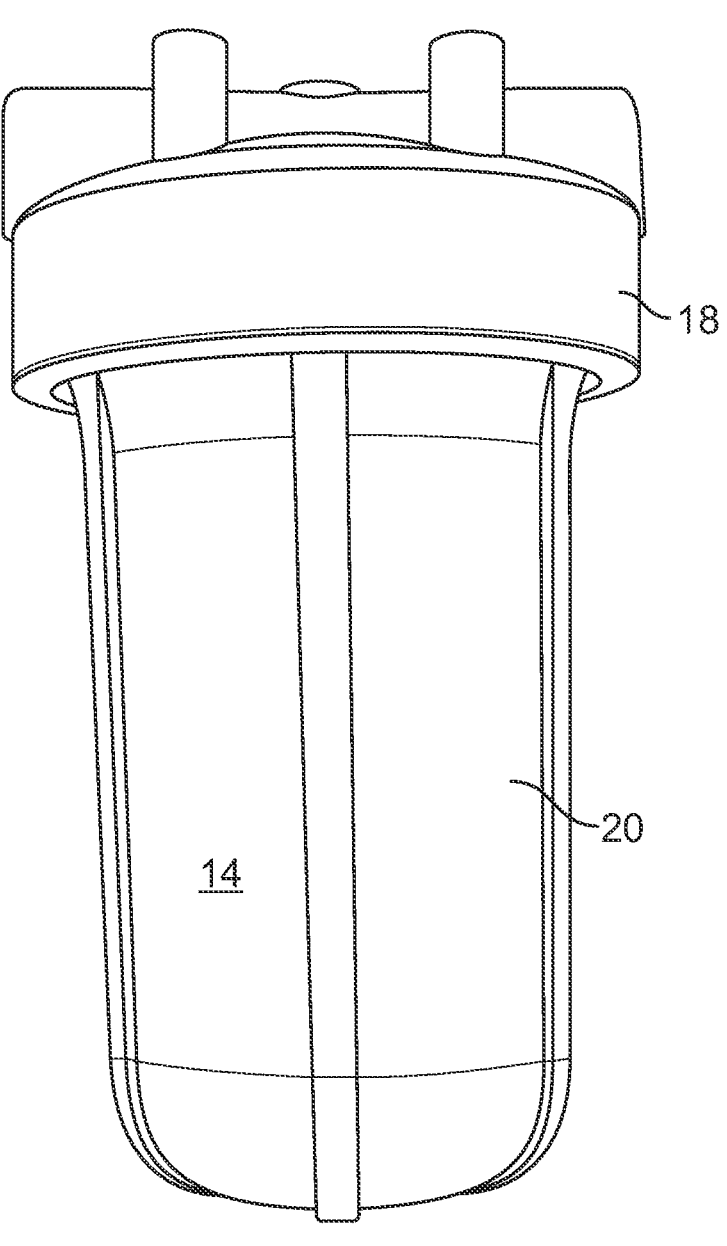
FIG. 3A is a side view of a typical single element lightweight fibrous media filter outer housing that contains either one intermediary vessel comprising a cartridge or basket to hold the LFM filter balls. The term "element" refers to a single cartridge or basket holding LFM filter balls in a pre-compressed state ready for installation into an outer housing in order to filter a flow of water requiring removal of particulates.
Figure 3B:
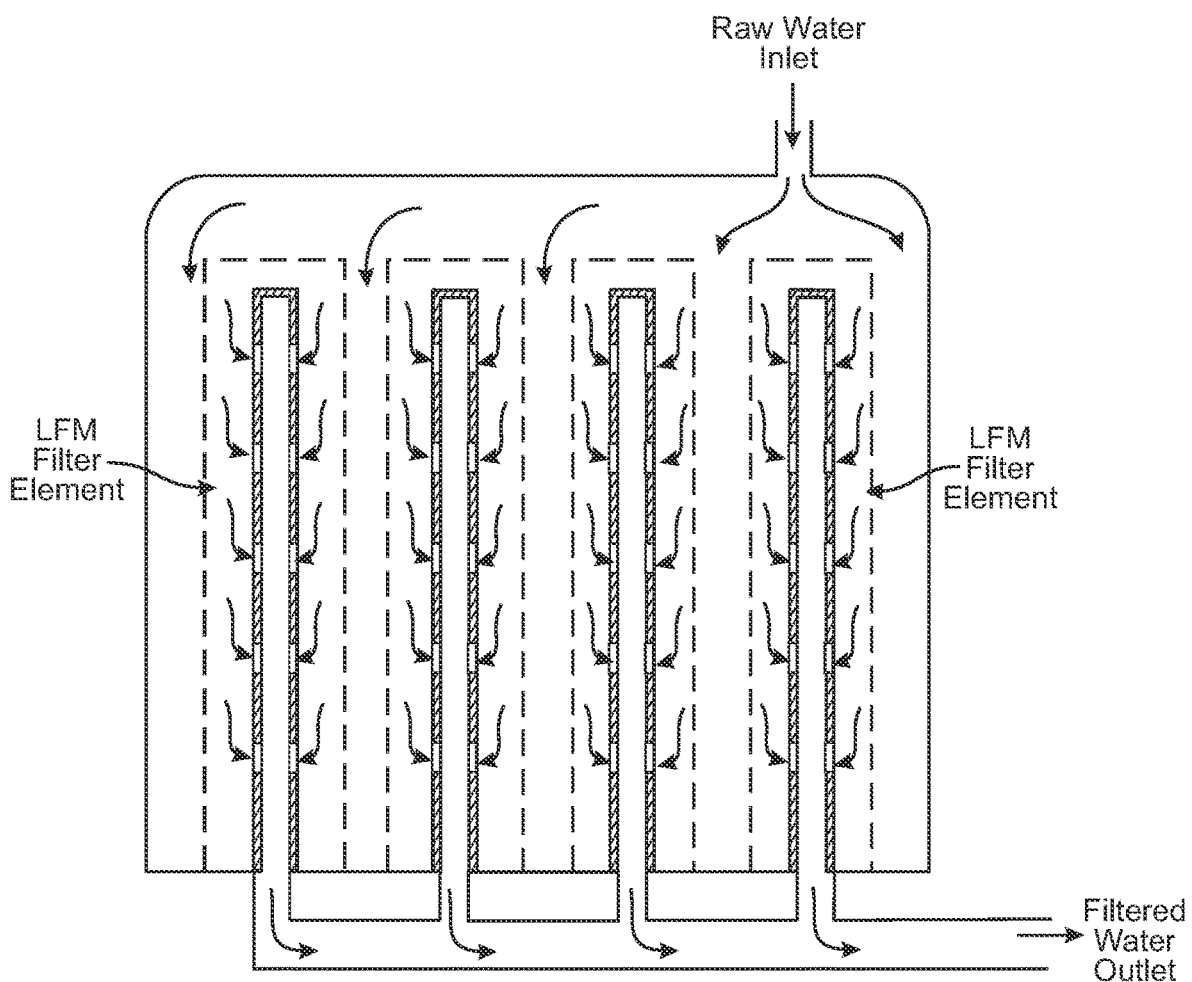
FIG. 3B is a side view of a typical multi-element LFM filter allowing multiple intermediary vessels containing LFM filter balls to be placed into a single housing.
Figure 3C:
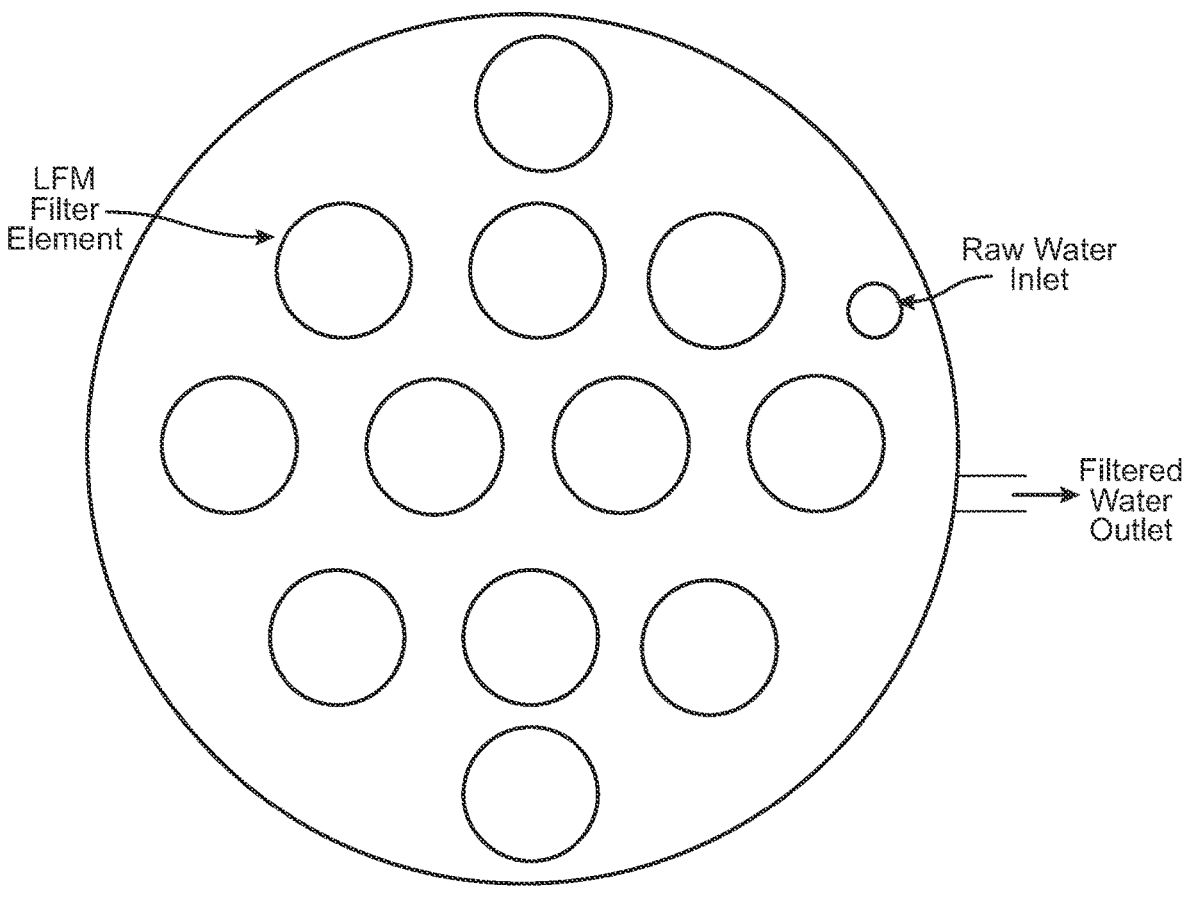
FIG. 3C is a plan view of the multi-filter element housing to clarify its configuration.

The manual pre-compression is contemplated for use inside of a filter housing 14 (See FIGS. 3A-3C) used to accept either: a filter cartridge (See FIGS. 2A-2B), or a bag filter basket (See FIGS. 2A and 2C). In these embodiments, the LFM filter balls 10 are manually pre-compressed during installation into an intermediary vessel or element which, in turn, is installed inside an outer housing 14 that is designed to hold the pressure of feed-water and prevent water from bypassing the LFM filter mass 16. A commercially-available 10-inch long outer housing 14 is shown in FIG. 3A which can be used for this purpose. Similar housings are typically in the 10-inch and 20-inch lengths, although any length is possible. A multitude of elements (or intermediary vessels)

can be placed into an outer housing as shown in FIGS. 3B-3C. The LFM filter balls used in a manually pre-compressed intermediary vessel or element are manually removed from their housing and allowed to separate and expand for cleaning according to a buildup of differential pressure (signifying a buildup of entrained particulates) or on a timed interval.

FIGS. 2A-2C show the same outer filter housing used in FIG. 3A but in this view the LFMs 10 are pre-compressed inside an intermediary vessel or element, in the form of a separate open mesh cartridge, 26 or basket 32 before being installed within the outer filter housing 14 that utilizes a removable top 18. The top of the housing contains a sealing surface that seals the top of the bag filter basket when the bag filter basket is installed inside the housing and the housing top is installed. A separate LFM 10 cartridge 26 is also shown in FIG. 2B and a separate LFM 10 basket 32 is shown in FIG. 2C, both outside of their outer housings for clarity of discussion. As shown in FIG. 2A, the open mesh filter cartridge housing 26 allows raw water to enter the cartridge in a radial flow pattern 28 in the annular space 30 formed between the outer surface of the open mesh filter cartridge housing 26 and the inner surface of the outer filter housing 14. The outer sides of the cartridge 26 or basket 32 includes a series of perforations 40 through which water can radially flow 28 into the LFM filter balls 10. Filtered water that has traveled through the LFM filter exits through a center tube 22 that is an internal component of the cartridge assembly. Also, the LFM filter balls 10 can be removed from the filter cartridge 26 periodically for cleaning if the ends of the cartridge 26 are removable. In that case, the LFM filter balls 10 can be cleaned after they are removed from the cartridge and, once cleaned, manually returned to the cartridge for re-installation into the outer housing. LFM filter balls are cleaned either manually or in a device that imparts turbulence into water, such as a washing machine.

FIG. 2C shows the use of an intermediary vessel or element comprising an open mesh basket that does not utilize a cartridge, but instead contains an inner basket 32. When the basket is installed inside a filter outer housing, this embodiment looks identical to FIG. 2A, but in this case, the LFM filter balls 10 are pre-compressed inside an open-top inner basket 32 that is then installed within the outer housing 14. This configuration is similar to a bag filter housing that uses an inner basket to hold an expanding filter bag during pressurized filtration. In this configuration shown in FIG. 2C outside of an outer housing, utilizing an internal basket 32, the inside of the housing top 18 will contain a sealing apparatus that mates perfectly with the top of the basket in order to seal the LFM mass inside the housing and eliminate bypass of raw water. In addition, the inside of the housing top 18 will also have an attached perforated filtered water tube 22 to allow filtered water to exit the LFM media pack. In FIG. 2C, the filtered water tube 22 is shown truncated because its attachment to housing top 18 is not shown. During installation, LFM filter balls are manually pushed into the basket to pre-compress and then the perforated filtered water tube 22, typically attached to the filter top 18, is pushed down through the center of the LFM filter ball mass. The top of the basket 32 is open, but will be sealed once the housing top 18 of the outer housing 14 is screwed into place. When the basket 32 is removed from its outer housing 14, the LFM filter balls 10 can be removed periodically for cleaning. Once cleaned, the LFM filter balls 10 can be returned to the basket 32 for reuse. When installed into a filter housing 14, the open mesh basket 32 also allows raw water to enter the basket 32 through the annular space 30 in a radial flow 28 pattern, in the same manner as the cartridge 26 previously described.

In the configurations illustrated in FIGS. 2A-2C, there exists an open mesh inner basket 32 or open mesh cartridge housing 26 (herein called an intermediary vessel or element) with a perforated filtered water tube 22 in the center with a plurality of apertures 24 found therein. LFM filter balls 10 are squeezed inside the basket 32 or cartridge 26 and along the length on the outside 34 of the filtered water tube 22 in a pre-determined quantity to produce a pre-determined density of media and consequently, a pre-determined filtered water quality. Un-filtered water 36 flows through an inlet opening 44 and into an annular space 30 around the outside of the perforated basket 32 or open mesh cartridge housing 26 and enters the LFM filter ball mass 16 in a radial-flow direction 28 from outside of the basket 32 or open mesh cartridge housing 26. But it is acknowledged that water may flow in other directions as well, and the radial flow direction is not the only direction that water can flow in an LFM filter.

During filtration, water and particulates travel through the relatively large openings of the basket 32 or open mesh cartridge housing 26 which are holding the LFM filter balls 16 and particulates get caught in the thousands of tortuous paths inside the pre-compressed LFM filter balls 16. Water continues through the LFM filter balls 16 and flows into one of the perforations 24 of the filtered water tube 22 in the center of the filter configuration. From the central perforated tube 22, filtered water exits in flow 48 through an outlet opening 46 from the housing 14.

This configuration creates a manually pre-compressed and manually-cleaned filter where the LFM filter balls 10 are removed periodically for cleaning before reuse. A pre-determined number of LFM filter balls 10 placed into the housing 14 between the basket 32 or open mesh cartridge filter 26 and the inner filtered water tube 22 will dictate the level of pre-compression and therefore the level of filtration and consequently, turbidity removal. As an example, 40 LFM balls, shown in FIG. 1, are placed inside a typical 10-inch housing, shown in FIG. 3A, holding a cartridge or basket as shown in FIGS. 2A-2C. The ratio of LFM balls to intermediary vessel (cartridge/bag filter) volume is 40 LFM balls per 100 cubic inches.

While the LFM filter balls 10 are in operation and removing particulate matter from a water stream, they will build up a differential pressure within their media bed due to particulates entrained and accumulating inside the LFM filter balls 10, like all media filters. In this configuration, once differential pressure rises to a pre-determined level, such as 10-15 psi, or according to a pre-determined timed schedule, the individual LFM filter balls 10 can be removed from the housing 14, manually cleaned by hand or in a device, such as a washing machine, and then replaced and reused indefinitely.

The use of relatively small, separate and individual LFM filter balls 10 makes cleaning very effective and complete, unlike conventional, rigid-configuration cartridge filters or bag filters. Separate and individual filter balls 10 allow for complete cleaning of each component comprising an LFM filter inside and on its surface, unlike other filter designs, such as standard cartridge filters and bag filters. As proven during long-term testing, the LFM filter of the instant invention represents a permanent filter media mass 16 that can be cleaned periodically for an indefinite period of time. It is also understood that LFM filter balls that are larger or smaller than those shown in FIG. 1 can be used with the filters described herein. Likewise, intermediary vessels that may not resemble a conventional cartridge or bag filter housing, may be implemented with a future LFM filter design. What is important is for the LFM filter balls to be pre-compressed within an intermediary vessel, or element before placing the element into a pressure-containing housing.

The fact that the LFM filter media 16 is very lightweight, compact, and can be cleaned repeatedly, makes it an excellent candidate technology for mobile water treatment systems, especially for use in remote and challenging locations where resupply of filter replacements may not be feasible. These features are especially important for applications that include military combat locations and disaster relief operations. However, if resupply is not a limiting factor, the LFMs 10 can, of course, be removed and replaced, if desired, like an ordinary disposable filter cartridge.

The FIG. 2A-2C configurations allow for a preferred radial flow 28 direction of raw feed water into the LFM filter mass 16. In FIGS. 2A-2B and 2A-2C, LFM filter balls 10 are shown installed and pre-compressed to form a single filter mass 16 inside their respective intermediary vessels or elements, and are intended to be installed into outer housings designed to withstand water pressures, as shown in FIGS. 3A-3C.

The pre-compression methods shown in FIGS. 2A-2C include an inner cartridge 26 or an inner basket 32, showing one filter in one housing. It is also envisioned that multiple pre-compressed cartridges or baskets could be used in a larger, single housing when higher flows are required. This will save space and allow faster removal of LFM elements when they must be replaced or undergo a cleaning process. FIGS. 3B and 3C show a multi-element LFM filter configuration. The multi-element housing can be opened to access the LFM elements, whether they are cartridges or bag filter baskets for removal and replacement.

Figure 4A:
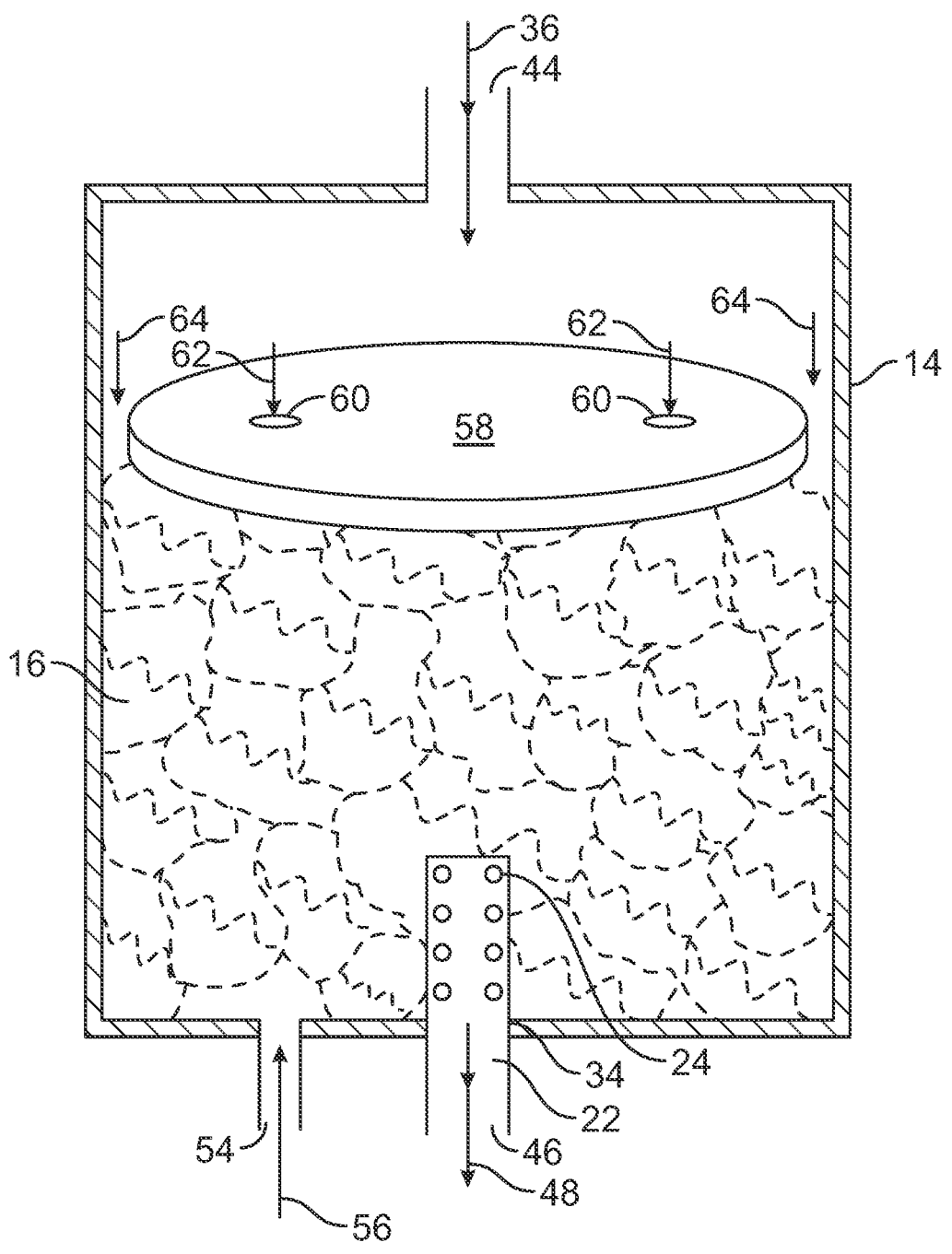
FIG. 4A is a cross-sectional view of an alternate embodiment of the lightweight fibrous media filter of the instant invention wherein a hydraulic pre-compression plate with the capability of automatic backwash is incorporated therein that uses a down flow filtration orientation.

The alternate embodiment incorporating an auto pre-compression in an in-situ cleaned configuration is illustrated in FIGS. 4A-6) In addition to the manually-cleaned filter embodiments described above, the LFMs 10 can be back-washed and cleaned in-situ automatically with a combination of turbulent water and air injection. This backwashing technique is initiated periodically to prevent the LFMs from becoming too dirty from entrained particulates. For example, this process can pre-set to occur every 1-4 hours. In comparison, manual cleaning of LFMs usually occurs every 1-7 days, depending upon raw water quality. FIGS. 4A-4B show two possible auto-cleaned configurations that use two different flow directions. In FIG. 4A, the flow direction during filtration is downward while in FIG. 4B, the flow direction during filtration is radially inward. In both configurations, the LFMs 10 are cleaned in-situ and not removed from their housing during the cleaning process.

Figure 5:
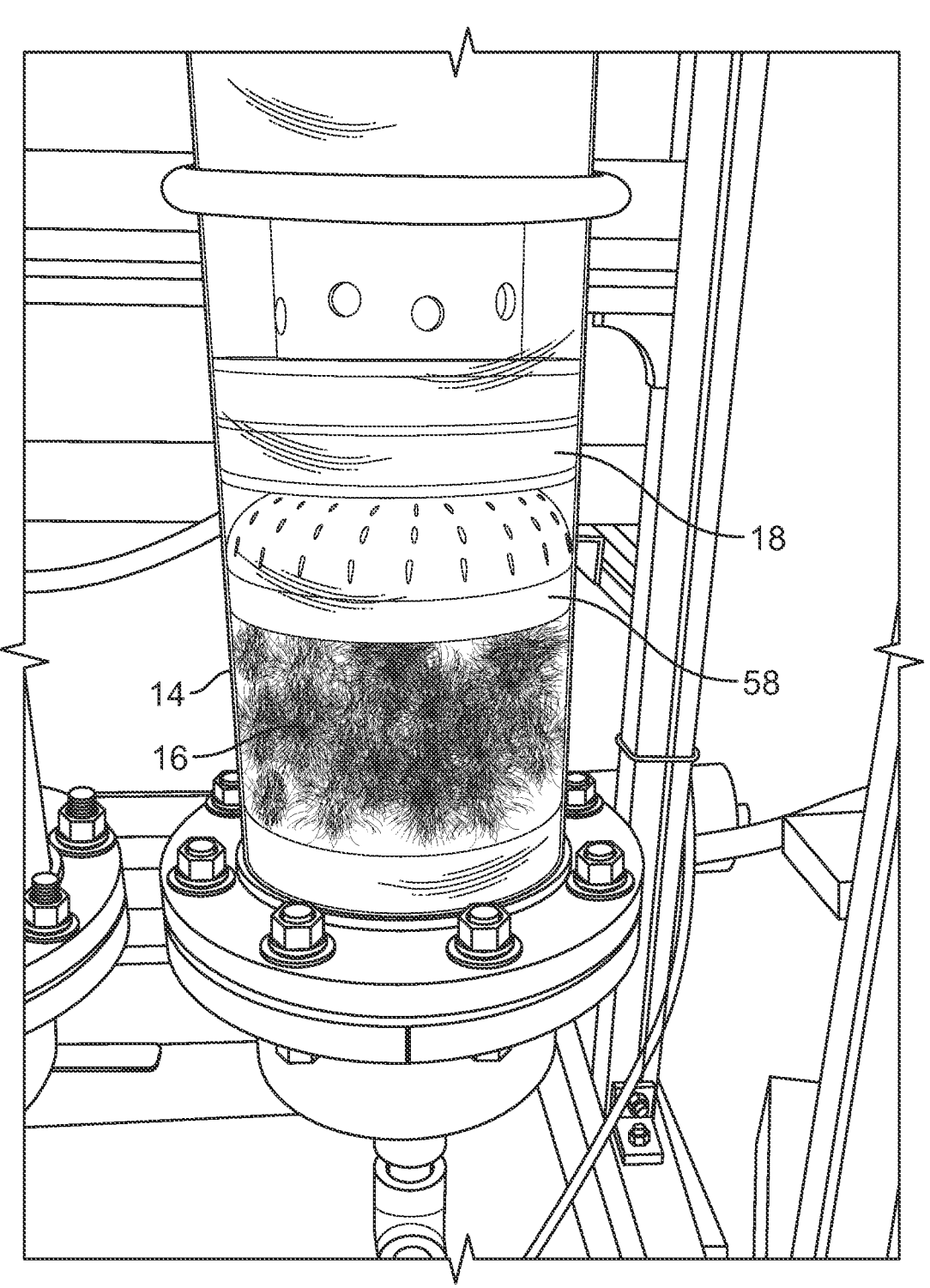
FIG. 5 is a side view of the embodiment shown in FIG. 5A showing the filtration mode in a system as a whole.
Figure 6:
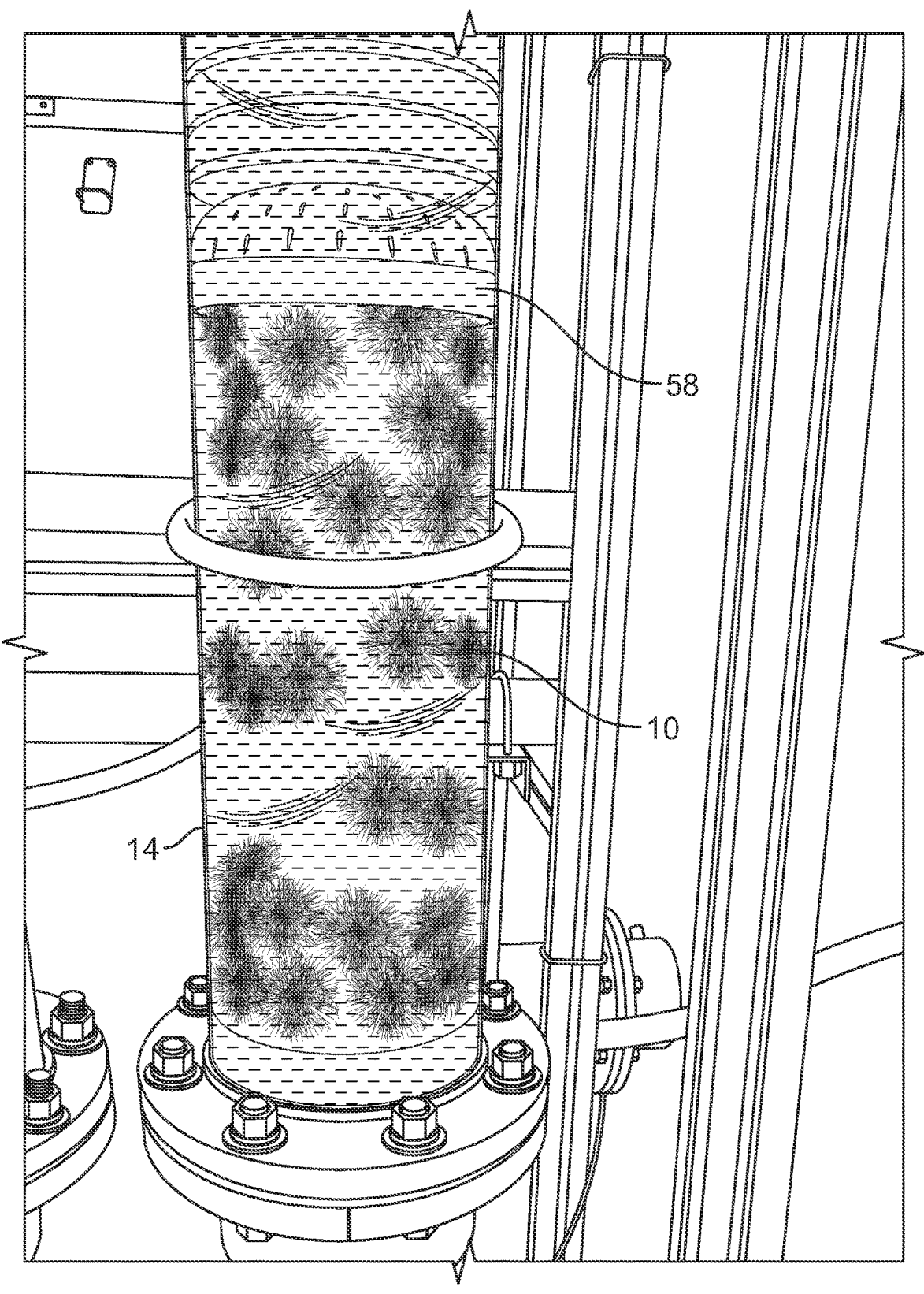
FIG. 6 is a side view of the embodiment shown in FIG. 6 showing the backwash mode in a system as a whole.

FIGS. 5-6 show the system in context rather than schematically of an auto-backwash LFM filter. FIG. 5 shows the filtration stage and FIG. 6 shows the backwash stage. A downflow configuration is shown schematically in FIG. 4A. In this figure, a hydraulic pre-compression plate 58 pushes down onto the LFMs 16 located below the plate 58 whenever raw water flows 36 through the housing. Raw water flows around the edges 64 and/or through 62 optional holes 60 in the body of the pre-compression plate 58 to the area below containing the randomly-packed LFM mass 16. The hydraulic pre-compression plate 58 compresses the LFMs 10 because the plate 58 is solid enough to cause water to move it in the direction of waterflow 62 as water pushes against its body 58 and water flows around the edges 64 of the plate 58 and/or through optional holes 60 in the plate 58. As a result, the pre-compression plate 58 compresses the individual LFMs 10 into a single filter-pack 16 whenever water flows through the housing. A small center perforated tube 22 with a plurality of perforations 24 allows filtered water 48 to exit at the bottom 46 of the LFM filter housing. Periodically, water flow is reversed 56 and air is introduced near the bottom 54 of the housing which causes the pre-compression plate 58 to rise because of the upward water flow 54. Once the pre-compression plate 58 rises, the LFMs 10 expand due to the water and air mixture and entrained particulates become accessible for removal from the LFMs 10 due to the turbulent action caused by the combination of backwash water and air.

Figure 4B:
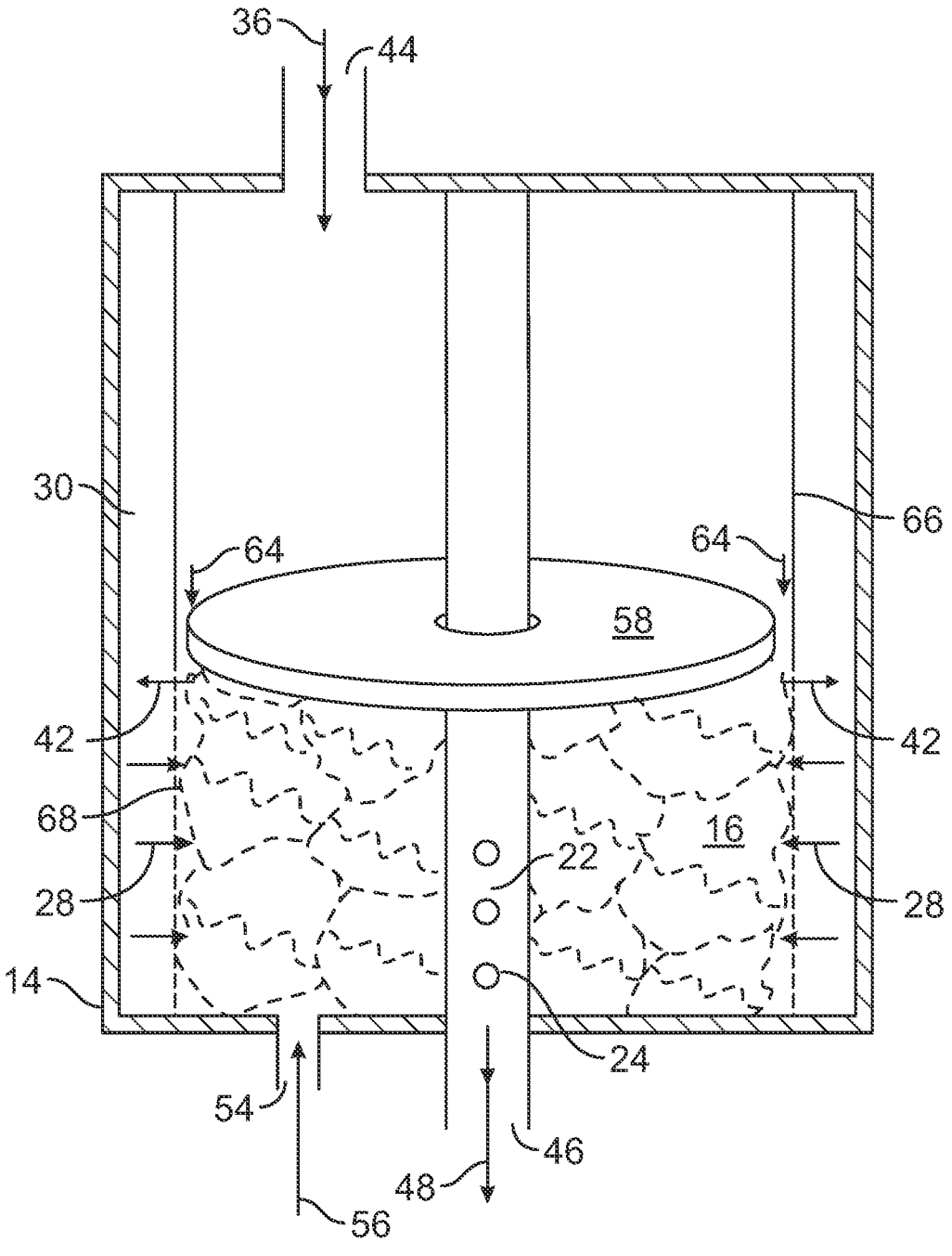
FIG. 4B is a cross-sectional view of another embodiment of the lightweight fibrous media filter with the capability of automatic backwash that uses a radial flow filtration orientation.

In the LFM filter radial flow auto-backwash configuration shown schematically in FIG. 4B, a hydraulic pre-compression plate 58 pushes down onto the LFM mass 16 located inside a center cylinder 66 as a result of water flow. In order to make this occur as a result of hydraulics, the center cylinder has an upper section that is solid and a lower section that is perforated. Raw water flows down the inside of the solid surface section of the center cylinder 66 causing the pre-compression plate to move downward in the same manner as the down flow configuration shown in FIG. 4A. But once the raw water flow enters the lower perforated section, raw water 42 flows radially outward into the annular space through the top of the perforations and the pre-compression plate will stop moving downward at that point. The beginning of the perforations in the center cylinder will therefore dictate the level of pre-compression that is meant to be imparted into the LFM filter mass 16. Once raw water flows into the annular space between the perforated center cylinder and the inside of the outer housing, it will change direction and flow in a radial flow direction 28 into the LFM mass 16 in order to access the inner perforated pipe as filtered water before exiting the housing.

The LFM mass 16 surround a center perforated tube 22 with a plurality of perforations 24 that allows filtered water 48 to exit the LFM filter housing. Periodically, water flow is reversed 56 and air is introduced near the bottom 54 of the housing which causes the pre-compression plate 58 to rise because of the upward water flow 56. Once the pre-compression plate 58 rises, the LFMs 10 expand due to the water and air mixture and entrained particulates become accessible for removal from the LFMs 10 due to the turbulent action caused by the combination of water and air.

The LFM auto-clean system embodiment of the instant invention is shown in FIGS. 7A-7D. The is a system to clean LFM filter media 16 automatically, outside of their filter housing 70 in order to utilize a robust and aggressive external washer device that would not be possible to create inside an LFM housing. This configuration would especially be suitable for high flow systems and could accommodate virtually any flow rate including 1,000 gallons per minute and larger. This method is possible because LFM filter media 16 is made up of individual filter balls 10 that are relatively small and lightweight and therefore can be pumped through a conduit hose by means of water flow or vacuum from one area/container to another. It is envisioned that multiple LFM housings would be connected to a single washer device, but for ease of description, one housing is connected to one washer device as shown in FIGS. 7A-7D. The auto-clean system starts with two sets of LFMs 10. The first set is located in the filter housing 70 which, as described above in the earlier embodiments and shown in FIGS. 4A, 4B, 5, and 6, includes a water inlet 44, a compression plate 58, a water outlet 46 proximate the perforated tube 22 and an inlet 90 for water and air to be introduced to raise the compression plate 58. The second set is located in a standby container 72, both containers being connected by a conduit 76 that includes a pump 78 and a valve to open and close the flow. Note: there would be a multitude of valves used for the various water inlets and outlets used with the components shown in FIGS. 7A through 7D. However, valves are not shown because they would reduce the clarity of the schematics and are not necessary to convey the meaning of the auto-clean system.

One set of LFM filter media 16 is used in filtration with pre-compression as described previously in this patent application and shown in FIGS. 4A, 4B, 5, and 6. The filter housing 70 contains an additional inlet and conduit 76 and outlet and conduit 82 each with a valve that opens and closes by means of an electrical or pneumatic mechanism and control. The second conduit 82 connects the filter housing 70 and the LFM washer device 74 that also includes a pump 84 and a valve.

Figures 7A, 7B, 7C, 7D:
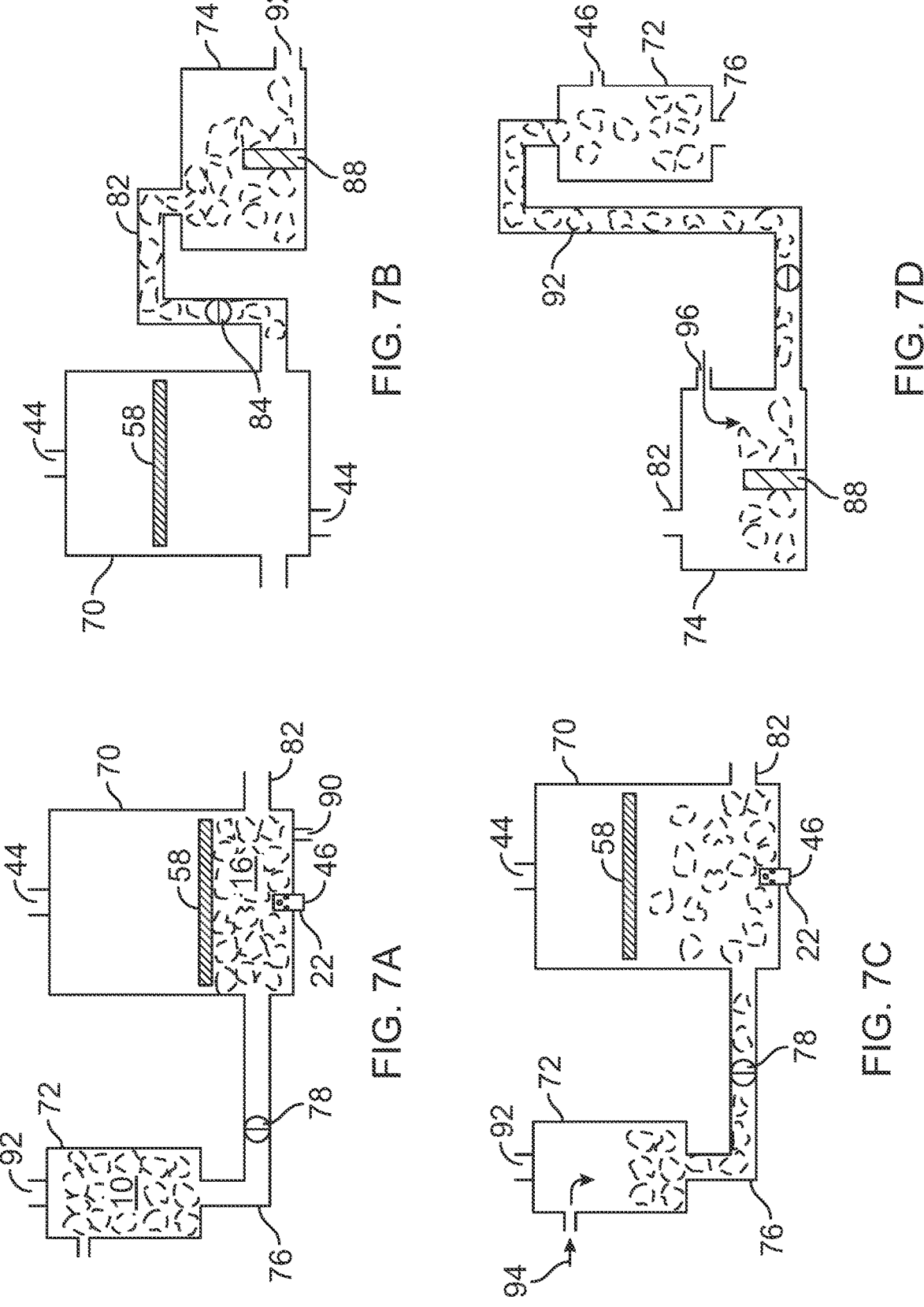
FIGS. 7A-7D show a schematic view of an alternate embodiment of the lightweight fibrous media filter of the instant invention in the filtration mode of an auto-clean system configuration for high-flow applications. Note.

According to a timed schedule or when a differential pressure builds up to a nominal 10-15 PSI, the LFMs 10 are not cleaned in their housing as previously described and shown in FIGS. 4A, 4B, 5, and 6. Instead, as shown in FIG. 7B, they are transported by means of water flow or vacuum created by a pump 84 through a hose 82 to an adjacent washer device 74. The washer device 74 is specifically designed to impart significant agitation to the LFMs 10 in the same manner as a washing machine imparts agitation to clothes with an agitator 88. Creating agitation in a device outside the filter housing 70 allows the washer device 74 to be designed with one or more robust agitators 88 that are able to create greater turbulence than would be possible inside a filter housing 70. It also facilitates the use of cleaning aids, such as detergents to be used in an LFM wash-cycle.

As soon as the LFMs 10 are removed from their filter housing 70 as shown in FIG. 7B, new/previously washed LFMs 10 are transported by means of water flow 94 through a hose 76 from a standby container 72 back into the filter housing 70 as shown in FIG. 7C. Replacement of the LFMs 10 in the filter housing 70 will allow the filter to go back online with very little downtime, approximately on the order of 5-minutes after removing the dirty LFMs described above.

The LFMs 10 are cleaned in the washer device 74 by means of very turbulent agitation. As shown in FIG. 7D, once the LFMs 10 are washed and rinsed, they will be transported again by means of pumped water flow 96 or vacuum through a hose 92 to an adjacent standby container 72 designed to store clean LFMs 10. Eventually, the clean LFMs 10 will be transported back to the filter housing 70 when they are needed to replace the set of LFMs 10 after becoming dirty from operating in the filter housing 70.

With the auto-clean system designed for LFM filter media 10, it can be envisioned that multiple filter housings 70 may be connected to a single washer device 74. In an operational scenario using multiple filter housings 70 and one washer device 74, a sequence of LFM cleanings initiated based upon time, and not differential pressure, would probably be most effective. Although differential pressure initiation of LFM cleanings is also possible.

The key to the filter designs described herein is that the individual LFM filter balls 10 are pre-compressed by inserting the LFM filter balls either in an intermediary vessel or element, such as a pre-compressed cartridge installed in an outer housing, or a pre-compressed basket installed in an outer housing With a weight of only 5-ounces per filter set, the LFMs represent a very lightweight filter media. In order to put this weight into perspective, the level of filtration of an LFM filter (with a 5-ounce weight) represents the equivalent of a conventional media filter that contains about 20 pounds of granular (sand) media. Therefore, the LFM media represents a 98% reduction of weight compared to standard sand filter media. For this reason, the LFM filter is considered ideal for mobile water treatment systems where a lightweight and compact pre-filter is desired. It is the intent of the invention to allow the simplicity of the LFM filter balls to be used for moderate and low flow water treatment systems that are typical of mobile applications used by military and disaster relief operations.

In addition to removing water-borne particulates, the LFM filter will also remove oil from water by coalescing small oil particles into larger particles when the synthetic material used to make the LFM filter media has an inherent affinity/attraction for oil. Such synthetic materials include: polyethylene and polypropylene, but there are many more such materials with an affinity for oil. The LFM filter will therefore function as an oil-coalescer and oil/water separator. An oil/water separator will be cleaned in the same manner as the particulate filters described previously.

During testing, the combination of an LFM filter and 5-micron cartridge filter was operated with a natural seawater feed source. A 10-inch long LFM filter (containing 40 pre-compressed LFM filter balls comprising a ratio of 40 LFM balls in 100 cubic inches) routinely filtered 18,000 to 20,000 gallons of natural seawater with a feed-water turbidity level of 1-5 NTU (Nephelometric Turbidity Units). During this test, LFM filter cleanings were initiated when a 10 to 15 psi differential pressure was reached. This longevity of operation for such a compact and lightweight filter that is field-cleanable is truly impressive. Furthermore, the test results show that an LFM filter resulted in an average turbidity removal between 85% to 95% during the test period that processed a total of over 300,000 gallons of raw seawater (in just one 10-inch long LFM filter). In addition, the LFM filter stage (stage 1) was shown to protect a 5-micron cartridge filter (stage 2) and resulted in extending the life of the cartridge filter by a factor as much as 8 times (compared to no pre-filter).

Figure 8:
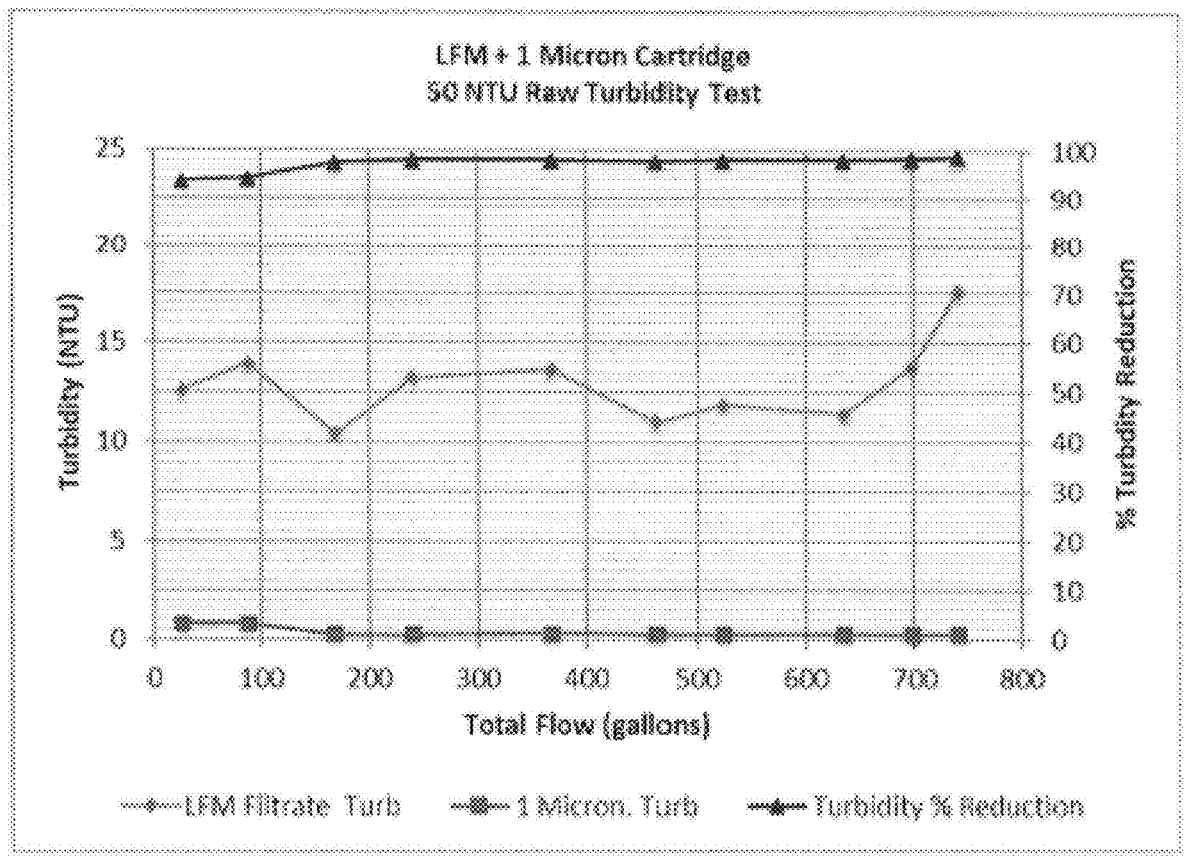
FIG. 8 shows a graph indicating the results of a high-turbidity feed-water challenge of 50 NTU turbidity of the LFM filter performed using Arizona fine AC test dust.

During additional testing, Arizona fine AC test dust was added to raw seawater feed to create a high-turbidity feed-water challenge of 50 NTU turbidity. As shown in FIG. 8, during during the 50 NTU test, turbidity reduction was consistent and averaged over 95% for the LFM filter followed by a 1-micron cartridge. It was determined that the LFM filter alone removed about 50% of the turbidity-creating particulates and the 1-micron cartridge removed the remaining 45% of particulates. Also shown in FIG. 8, the LFM Filter, alone, reduced turbidity from over 50 NTU to a range of 10-17 NTU, while the 1-micron cartridge reduced turbidity further to less than 1 NTU. This result for the LFM filter is comparable to testing the turbidity reduction of multi-media and sand filters followed by 1-3-micron cartridge filters.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An apparatus for filtering water, the apparatus comprising:

an open mesh filter cartridge, and a perforated tube passing through an interior of the open mesh filter cartridge, wherein an annular space is formed between an inner surface of the open mesh filter cartridge and an outer surface of the perforated tube, wherein the open mesh filter cartridge includes a plurality of openings that permit unfiltered water to flow into the open mesh filter cartridge and into the annular space, wherein the perforated tube includes a plurality of openings that permit filtered water to flow into the perforated tube from the annular space located in the interior of the open mesh filter cartridge; and wherein the interior of the open mesh filter cartridge contains a plurality of compressed fibrous media balls each including a plurality of fibers extending outwardly therefrom, the compressed fibrous media balls, after being installed into the interior of the open mesh filter cartridge, remaining compressed within the interior of the open mesh filter cartridge, without a movable mechanical device providing a force onto the compressed fibrous media balls, by virtue of being positioned within the interior of the open mesh filter cartridge such that the fibers of the compressed fibrous media balls intermesh with each other and with the openings of the open mesh filter cartridge and with the openings of the perforated tube.

* * * * *